(12) United States Patent
Gostyuzhev

(10) Patent No.: US 12,095,496 B2
(45) Date of Patent: Sep. 17, 2024

(54) SELF-DIAGNOSTIC SYSTEMS AND METHOD FOR A TRANSCEIVER

(71) Applicant: Futurecom Systems Group, ULC, Vaughn (CA)

(72) Inventor: Sergey Gostyuzhev, Ontario (CA)

(73) Assignee: FUTURECOM SYSTEMS GROUP, ULC, Vaughn (CA)

( * ) Notice: Subject to any disclaimer, the term of this patent is extended or adjusted under 35 U.S.C. 154(b) by 91 days.

(21) Appl. No.: 17/503,745

(22) Filed: Oct. 18, 2021

(65) Prior Publication Data

US 2023/0121099 A1    Apr. 20, 2023

(51) Int. Cl.
  *H04B 1/44* (2006.01)
  *H04L 5/14* (2006.01)
(52) U.S. Cl.
  CPC ............... *H04B 1/44* (2013.01); *H04L 5/14* (2013.01)
(58) Field of Classification Search
  CPC ............ H04B 17/40; H04B 1/44; H04L 5/14
  See application file for complete search history.

(56) References Cited

U.S. PATENT DOCUMENTS

| | | |
|---|---|---|
| 1,584,220 A | 5/1926 | Farkouh |
| 2,486,536 A | 11/1949 | Olson |
| 3,475,700 A | 10/1969 | Ertel |
| 3,711,793 A | 1/1973 | Stachejko |
| 4,480,338 A | 10/1984 | Dobrovolny |
| 4,817,200 A | 3/1989 | Tanbakuchi |
| 5,533,097 A | 7/1996 | Crane et al. |
| 5,590,022 A | 12/1996 | Harvey |
| 5,594,394 A | 1/1997 | Sasaki |
| 5,634,200 A | 5/1997 | Kitakubo |
| 5,770,940 A | 6/1998 | Goder |
| 5,781,563 A | 7/1998 | Schalamon |
| 5,789,995 A | 8/1998 | Minasi |

(Continued)

FOREIGN PATENT DOCUMENTS

| | | |
|---|---|---|
| CA | 2736083 A1 | 9/2012 |
| EP | 1916738 A1 | 4/2008 |

OTHER PUBLICATIONS

Stratus Lite Repeater, Jun. 2017, 2 pages, Issue 2, 12-20314-EN, Codan Radio Communications.

(Continued)

*Primary Examiner* — Patrick C Chen
(74) *Attorney, Agent, or Firm* — Barbara R Doutre

(57) ABSTRACT

A self-diagnostic system and method is provided for a transceiver. The self-diagnostic system and method includes a controller and switching circuitry. The switching circuitry is connected to the transceiver and has two positions. The first position of the switching circuitry connects the transmitter and receiver of the transceiver to an antenna system and the second position of the switching circuitry connects the transmitter to the receiver via a power attenuator. After switching the switching circuitry to the second position, the controller initiates the diagnostic procedure by sending a signal to the transceiver. Upon receipt of the signal from the controller, the transceiver initiates the diagnostic procedure by having the transmitter send a preselected output signal to the receiver via the switching circuitry. During the diagnostic procedure, parameters of interest are measured and reported to the controller.

15 Claims, 6 Drawing Sheets

(56) References Cited

U.S. PATENT DOCUMENTS

| | | | |
|---|---|---|---|
| 5,903,548 A | 5/1999 | Delamater | |
| 5,914,544 A | 6/1999 | Tanaka | |
| 6,134,105 A | 10/2000 | Lueker | |
| 6,198,288 B1 | 3/2001 | Gauss | |
| 6,496,083 B1 | 12/2002 | Kushitani | |
| 6,560,444 B1 | 5/2003 | Imberg | |
| 7,129,805 B2 | 10/2006 | Marion | |
| 7,391,283 B2 | 6/2008 | Kearns | |
| 8,428,573 B2 | 4/2013 | Martz et al. | |
| 8,583,065 B2 | 11/2013 | Ben-Bassat | |
| 8,593,358 B2 | 11/2013 | Rappaport | |
| 8,594,611 B2 | 11/2013 | Chauhan et al. | |
| 8,937,816 B2 | 1/2015 | Trombino | |
| 9,026,041 B2 | 5/2015 | Forster | |
| 9,293,808 B1 | 3/2016 | Roberts et al. | |
| 10,115,510 B2 | 10/2018 | Keller | |
| 10,200,031 B2 | 5/2019 | Forstmaler | |
| 10,505,574 B2 | 12/2019 | Kolanski et al. | |
| 10,629,972 B2 | 4/2020 | Kuo | |
| 11,323,147 B1 | 5/2022 | Gostyuhev | |
| 2002/0100970 A1 | 8/2002 | Kitazawa | |
| 2002/0137471 A1 | 9/2002 | Satoh | |
| 2004/0032706 A1 | 2/2004 | Kemmochi | |
| 2004/0061578 A1 | 4/2004 | Vice | |
| 2004/0092285 A1 | 5/2004 | Kodim | |
| 2004/0127182 A1 | 7/2004 | Hayashi | |
| 2004/0157579 A1 | 8/2004 | Namura | |
| 2004/0242165 A1 | 12/2004 | Jedeloo | |
| 2004/0266378 A1 | 12/2004 | Fukamachi | |
| 2005/0035824 A1 | 2/2005 | Keams | |
| 2005/0048927 A1 | 3/2005 | Kemmochi | |
| 2005/0077980 A1 | 4/2005 | Watanabe | |
| 2006/0017607 A1 | 1/2006 | Hayata | |
| 2006/0035601 A1* | 2/2006 | Seo | H04B 1/40 455/78 |
| 2006/0170516 A1 | 8/2006 | Marion | |
| 2006/0245382 A1 | 11/2006 | Hayashi | |
| 2007/0018753 A1 | 1/2007 | Poveda | |
| 2007/0026836 A1 | 2/2007 | Chow | |
| 2007/0086349 A1* | 4/2007 | Liu | H04L 43/55 370/241 |
| 2007/0232228 A1 | 10/2007 | McKay | |
| 2007/0241155 A1 | 10/2007 | Trajkovic et al. | |
| 2008/0181282 A1 | 7/2008 | Wala et al. | |
| 2009/0077608 A1 | 3/2009 | Romerein | |
| 2010/0222012 A1* | 9/2010 | Shibuya | H04B 17/336 455/79 |
| 2010/0289597 A1 | 11/2010 | Wolfe | |
| 2012/0068899 A1 | 3/2012 | Ayotte et al. | |
| 2012/0195207 A1* | 8/2012 | Mueck | H04B 17/318 370/252 |
| 2014/0120968 A1 | 5/2014 | Mahmood | |
| 2014/0124908 A1 | 5/2014 | Sameshima | |
| 2014/0125545 A1 | 5/2014 | Forster | |
| 2016/0261267 A1 | 9/2016 | Liu | |
| 2017/0040996 A1 | 2/2017 | Zhao | |
| 2017/0126262 A1* | 5/2017 | Zakaria | H04B 1/1036 |
| 2017/0302269 A1 | 10/2017 | Forstmaier | |
| 2017/0345620 A1 | 11/2017 | Coumou | |
| 2018/0013425 A1 | 1/2018 | Foley | |
| 2019/0074857 A1 | 3/2019 | Kolanski et al. | |
| 2019/0110021 A1 | 4/2019 | Bailey | |
| 2020/0144032 A1 | 5/2020 | Ulrich | |
| 2020/0279844 A1 | 9/2020 | Brogle | |
| 2021/0013922 A1* | 1/2021 | Watanabe | H04B 1/44 |
| 2021/0135326 A1 | 5/2021 | Puente | |
| 2021/0152208 A1 | 5/2021 | Moreschi | |

OTHER PUBLICATIONS

Stratus Product White Paper P25 & LTE: The best of both worlds, 17 pages, Codan Radio Communications.

* cited by examiner

SELF-DIAGNOSTIC SYSTEMS AND METHOD FOR A TRANSCEIVER

BACKGROUND

The present application generally relates to a transceiver for a communication system. More specifically, the present application is directed to a self-diagnostic system and method for a full-duplex transceiver.

A communication device may incorporate a transceiver for communication with the other communication devices in a communication system. The transceiver can include a transmitter to send signals to the other communication devices and a receiver to receive signals from the other communication devices. There are two primary types of transceivers that can be used in communication devices. One type of transceiver is a full-duplex transceiver (e.g., a transceiver in a smartphone) where the transmitter and the receiver can work simultaneously (i.e., at the same time) such that the transceiver is able to send and receive signals concurrently. The other type of transceiver is a half-duplex transceiver (e.g., a transceiver in a two-way radio) where the transmitter and the receiver do not operate at the same time and have to alternate between transmitting and receiving signals.

Since the reliability of a communication system depends on the continued operation of the communication devices in the communication system, diagnostics on the communication devices, specifically diagnostics on the transceivers of the communication devices, should be performed regularly. Typically, performing diagnostics on a communication device installed in a field location (e.g., at a customer site) involves a technician travelling to the location of the communication device and performing the diagnostic tests on the transceiver. Significant time and cost can be incurred from having the technician travel to the site to perform the diagnostics on a communication device. In addition, once the technician arrives at the site, the technician has to connect appropriate test equipment to the transceiver in order to perform the diagnostic tests on the communication device, which can result in significant down time for the transceiver (and possibly the communication system). Further, the test equipment used to perform diagnostics on a communication device can often be expensive because the test equipment has to be designed to handle the full output power of the transceiver. Due to the time and expense involved with performing diagnostics on a transceiver of a communication device, maintenance on the transceiver is often delayed until there is a failure of the transceiver or the communication device, which can result in interruptions to the operation of the communication system.

SUMMARY

The present application is directed to systems and methods for performing self-diagnostics in a full-duplex transceiver. To perform self-diagnostics, the transceiver can be connected to switching circuitry that either connects the transmitter and receiver of the transceiver to an antenna system for communications or to each other (i.e., the transmitter is connected to the receiver) for diagnostics. The switching circuitry can be automatically controlled to connect the transmitter to the receiver when diagnostic procedures are required for the transceiver. Once the switching circuitry is in the proper position, the diagnostic procedures at the transceiver can then be automatically performed without any user input being needed. For example, a diagnostic procedure can be performed each time the transceiver (or the communication device incorporating the transceiver) is transitioned from a sleep state or an "off" state.

The results of the diagnostic procedures can then be compared to predetermined threshold values (or threshold ranges) to determine if the transceiver is operating properly. For example, if the results of the diagnostic procedures are within a tolerance for a threshold value or within a predetermined threshold range, then the transceiver is determined to be operating properly. However, if the results of the diagnostic procedures are not within a tolerance for the threshold value or are outside of the predetermined threshold range, the transceiver is determined to be not operating properly and a remedial action can be taken (e.g., an alarm can be provided to a user).

To perform the diagnostic procedure, the transmitter can be controlled to output a signal having a preselected frequency and preselected amplitude (or voltage). The receiver can then receive the output signal from the transmitter since the transceiver is a full-duplex transceiver. During the transmission and reception of the signal, numerous parameters such as voltages, currents, power levels, etc. can be measured and recorded for components of the transmitter and/or receiver of the transceiver. In addition, if needed, the process can be repeated with the transmitter outputting additional signals having different preselected frequencies and/or preselected amplitudes. The measured parameters can then be compared to the corresponding threshold values or ranges for the parameters.

The present application is also directed to a self-diagnostic system for a transceiver. The self-diagnostic system includes a controller and switching circuitry. The switching circuitry is connected to the transceiver and has two positions. The first position of the switching circuitry connects the transmitter and receiver of the transceiver to an antenna system and the second position of the switching circuitry connects the transmitter (of the transceiver) to the receiver (of the transceiver) via a power attenuator. After switching the switching circuitry to the second position, the controller initiates a diagnostic procedure by sending a signal to the transceiver. Upon receipt of the signal from the controller, the transceiver initiates the diagnostic procedure by having the transmitter send a preselected output signal to the receiver via the switching circuitry. During the diagnostic procedure, parameters of interest are measured and reported to the controller.

One advantage of the present application is that it enables diagnostic procedures to be performed on a transceiver without having a technician travel to the location of the transceiver and connect equipment to the transceiver.

Another advantage of the present application is that it can detect a reduction in performance of the transceiver prior to a fault occurring at the transceiver.

Still another advantage of the present application is that diagnostic procedures can be automatically performed on a transceiver without user involvement.

A further advantage of the present application is that the performance of diagnostic procedures on a transceiver does not cause interference with other communication devices using the same frequency band because the transceiver is disconnected from the antenna during the diagnostic procedure.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
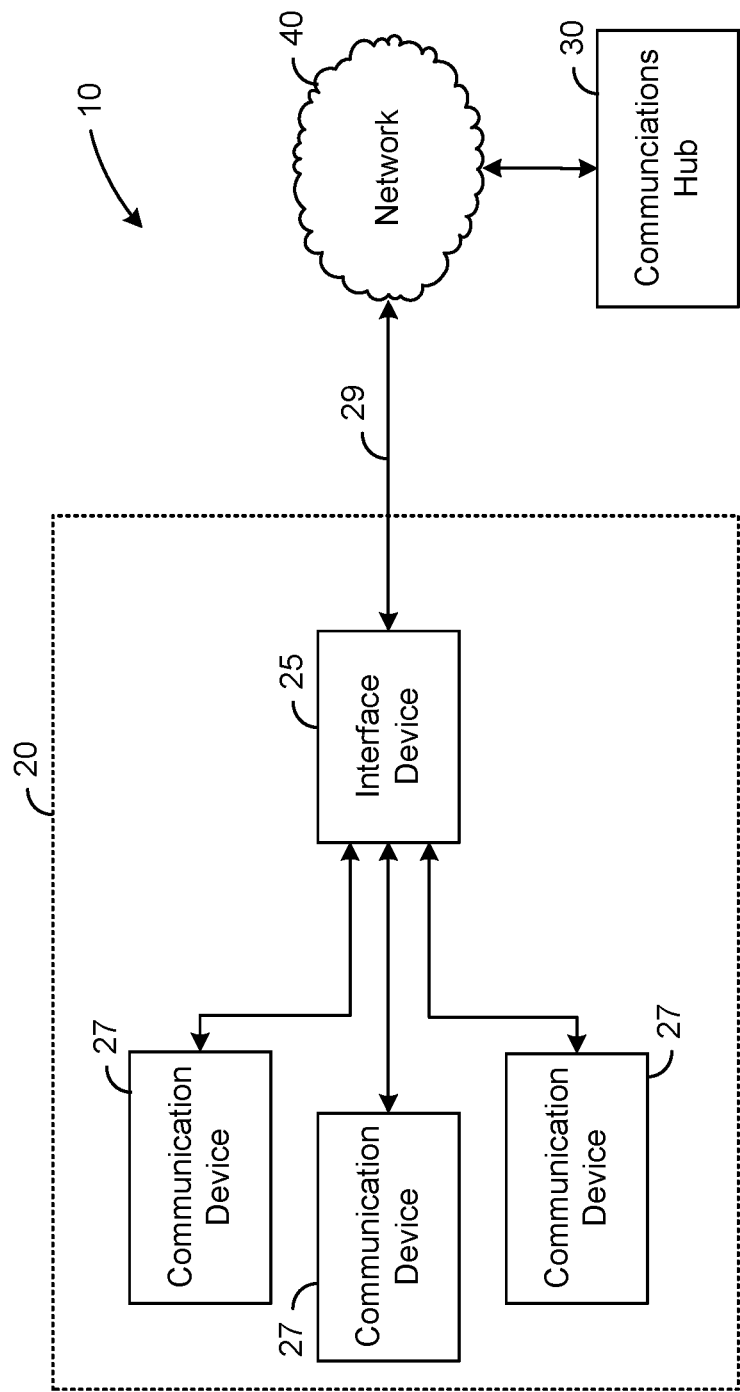
FIG. 1 is a block diagram showing an embodiment of a communication network.

FIG. 1 shows an embodiment of a communication network 10. The network 10 can include a local network 20 in communication with a communications hub 30 via a network 40. In one embodiment, the network 40 can be a public switched telephone network (PSTN). However, in other embodiments the network 40 can be the Internet and use the transmission control protocol/Internet protocol (TCP/IP) for communication, a cellular network, a local area network (LAN), a wide area network (WAN) or any other type of communication network using one or more communication protocols.

The local network 20 can have one or more interface devices 25 and a plurality of communication devices 27 in communication with the interface device(s) 25 using RF (radio frequency) or microwave communications. In other embodiments, other frequencies (e.g., infrared frequencies) can be used for communications. In one embodiment, the interface device 25 can be a portable communication system as described in more detail in U.S. Pat. No. 10,361,737, which is incorporated herein by reference.

In some embodiments, the interface device 25 can be used as a wireline repeater and base station, a back to back cross band repeater or a standalone repeater. When used as a wireline repeater and base station, the interface device 25 can be connected to the communications hub 30 by network 40 to provide the communications hub 30 access to digital conventional RF channels in local network 20 and support most digital conventional services and site features provided by the communications hub 30. When the interface device 25 is used as a back to back cross band repeater in a communication network, the interface device 25 can be used to relay signals from one interface device 25 to another interface device 25. The interface device 25 can also be used as a standalone repeater to provide full-duplex, local repeat capabilities on the configured channel of the local network 20. For example, the interface device 25, as a standalone repeater, can repeat one or more of voice, supplementary data services or packet data services between communication devices 27 in local network 20.

In one embodiment, the interface device 25 can communicate with communication devices 27 using any suitable RF or microwave channel, band or frequency such as a HF (high frequency) band (e.g., 3-30 MHz), a VHF (very high frequency) band (e.g., 30-300 MHz including 136 MHz to 174 MHz), a UHF (ultra high frequency) band (e.g., 300-3,000 MHz including 380 MHz to 430 MHz, 450 MHz to 470 MHz, 470 MHz to 512 MHz, 764 MHz to 776 MHz, 794 MHz to 806 MHz, 806 MHz to 824 MHz or 851 MHz to 869 MHz) or a SHF (super high frequency) band (e.g., 3-30 GHz). In other embodiments, the transmissions between the interface device 25 and the communication devices 27 can use the Project 25 (P25) Common Air interface (CAI) standard that specifies the type and content of signals transmitted by the communication devices 27 for digital radio communications. The P25 standard can be used by public services personnel to communicate with each other during emergency situations and in the course of performing their duties. However, in other embodiments, the communications between the communication devices 27 and the interface device 25 can use other suitable standards or communication protocols. In a further embodiment, the communication devices 27 can be 2-way radios configured to communicate with the interface device 25. However, in other embodiments, the communication devices 27 can be any device capable of RF (or microwave) communications such as smartphones, tablet computers and laptop computers. In an embodiment, the interface device 25 can be connected to the network 40 (and the communications hub 30) using an interface 29. In one embodiment, the interface 29 can be a V.24 wireline interface (an ITU standard that defines the functions of all circuits for the RS-232 interface). However, in other embodiments, the interface 29 can use other wired or wireless interfaces to connect the interface device 25 and the network 40.

The communications hub 30 can be located at a remote location from the local network 20 and can include a system infrastructure such that fixed-end equipment (e.g., data interfaces such as conventional channel gateway (CCGVV) or digital unit interface (DIU), consoles, voting/comparator system, etc.) and data/software applications (e.g., dispatch applications, location services applications, safety applications, security applications, etc.) at the communication hub 30 can have access to and communicate with the local network 20 and the communication devices 27. In one embodiment, the communications hub 30 can use a digital communication system such as ASTRO® 25 by Motorola Solutions.

Figure 2:
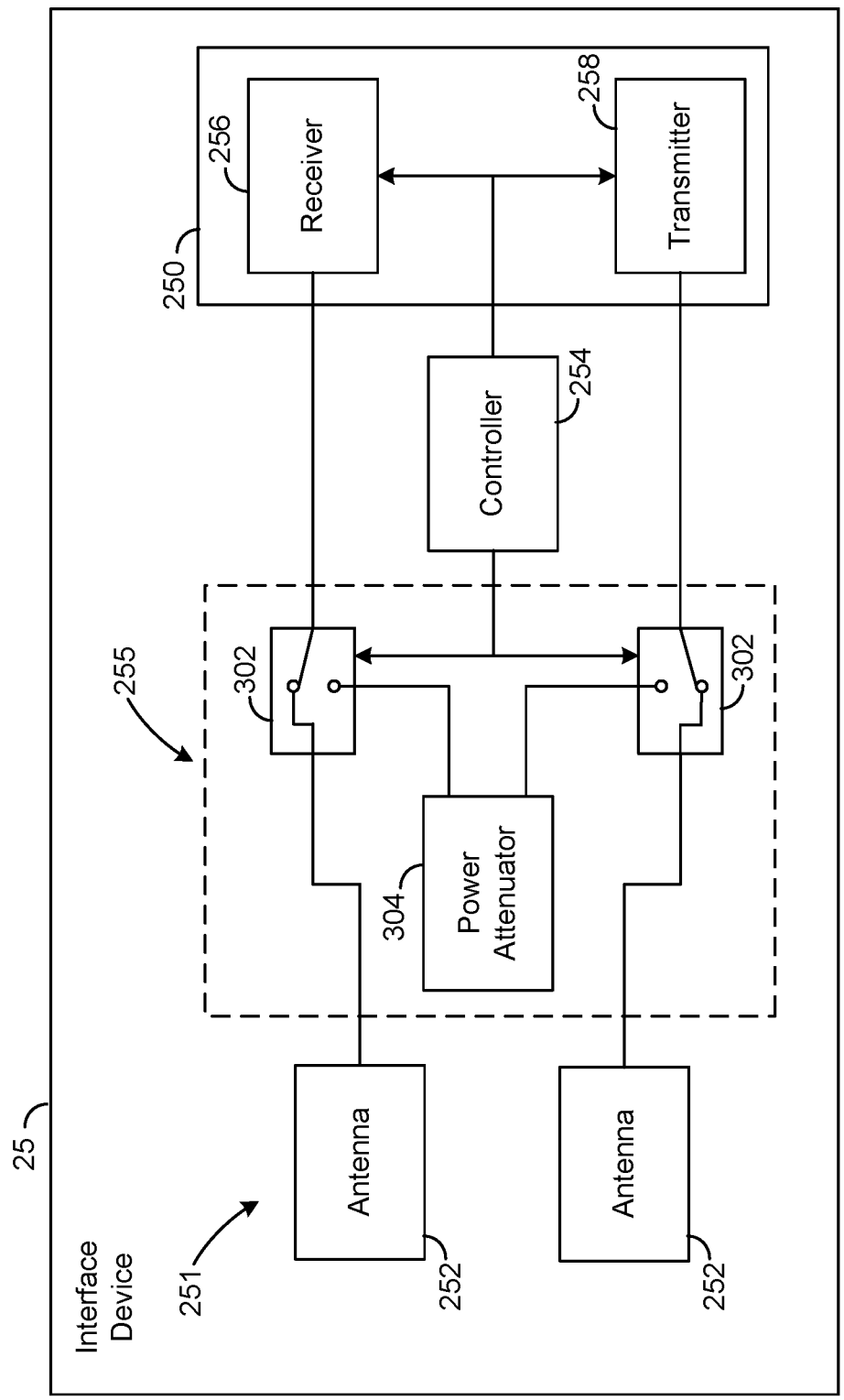
FIGS. 2-3 are block diagrams showing different embodiments of the interface device from FIG. 1.
Figure 3:
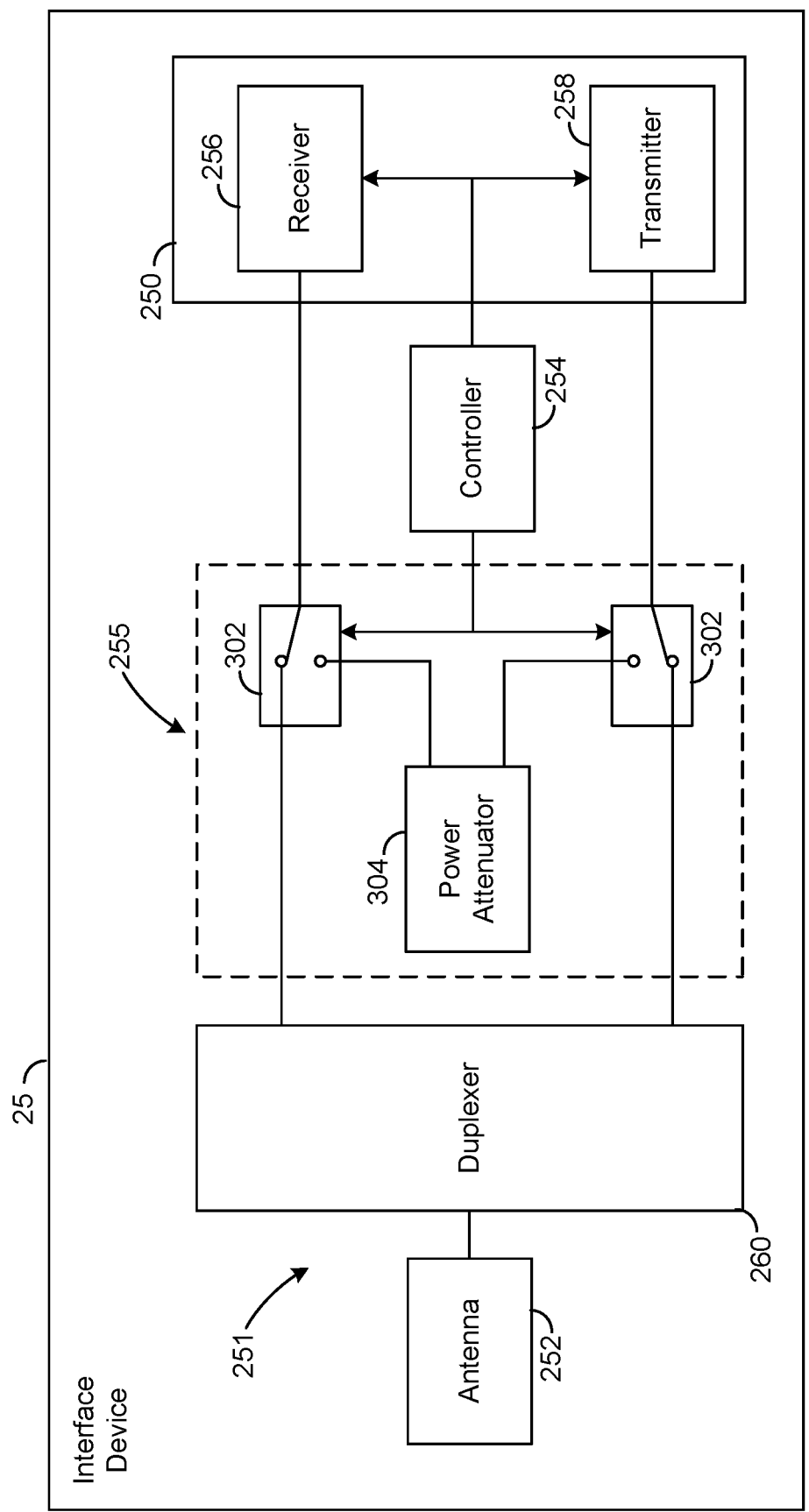

FIGS. 2 and 3 show different embodiments of the interface device 25. The interface device 25 can include an antenna system 251 (with one or more antennas 252), a controller 254, switching circuitry 255 and at least one transceiver 250 (with a receiver 256 and a transmitter 258). The transceiver 250 can be configured for full-duplex operation such that the receiver 256 and the transmitter 258 can transmit and receive signals simultaneously (i.e., at the same time). In addition, while the controller 254 is shown separate from the transceiver 250 in FIGS. 2 and 3, the controller 254 can be incorporated in the transceiver 250 in other embodiments.

In the embodiment shown in FIG. 2, the switching circuitry 255 can be used to connect a first antenna 252 (of the antenna system 251) to the receiver 256 (of the transceiver 250) and a second antenna 252 (of the antenna system 251) to the transmitter 258 (of the transceiver 250) such that the interface device 25 has separate antennas 252 for the receiver 256 and the transmitter 258. By having separate antennas 252 for the receiver 256 and the transmitter 258, the transceiver 250 can send and receive signals at the same frequency (in addition to at the same time). In contrast, in the embodiment shown in FIG. 3, antenna system 251 has a single antenna 252 for the receiver 256 and the antenna 258. Similar to the embodiment in FIG. 2, the switching circuitry 255 is connected to the receiver 256 and the transmitter 258, but instead of being connected to separate antennas 252 (as shown in FIG. 2), the switching circuitry 255 is connected to a duplexer 260 (of the antenna system 251), which duplexer 260 is then connected to the antenna 252. In one embodiment, the duplexer 260 provides a frequency division between the signals for the receiver 256 and the transmitter 258 such that the transmit and receive frequencies for the transmitter 258 and the receiver 256 are different.

Figure 4:
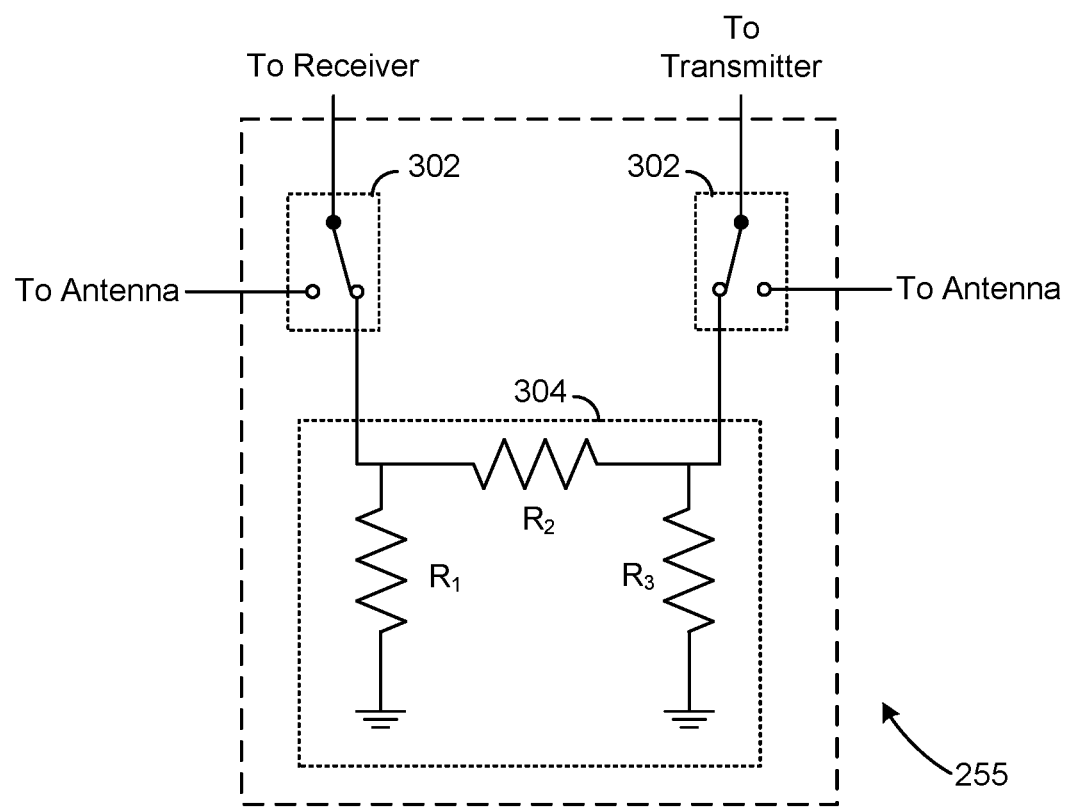
FIG. 4 is a circuit diagram of an embodiment of the switch arrangement from FIGS. 2-3 arranged for operation of the transceiver in diagnostic mode.

The switching circuitry 255 can be arranged for operation of the transceiver 250 in either a communication mode or a diagnostic mode. When the switching circuitry 255 is arranged for operation of the transceiver 250 in the communication mode (as shown in either FIG. 2 or FIG. 3), the switching circuitry 255 provides paths between the receiver 256 and the transmitter 258 and the antenna system 251 (either the separate antennas for the receiver 256 and the transmitter 258 (as shown in FIG. 2) or the duplexer 260 and the single antenna for the receiver 256 and the transmitter 258 (as shown in FIG. 3)). When the switching circuitry 255 is arranged for operation of the transceiver 250 in the diagnostic mode (as shown in FIG. 4), the switching circuitry 255 connects the receiver 256 to the transmitter 258 (and disconnects the receiver 256 and transmitter 258 from the antenna system 251) to permit diagnostics to be performed on the receiver 256 and the transmitter 258 of the transceiver 250. By disconnecting the antenna system 251, diagnostics are able to be performed on the transmitter 258 and receiver 256 without causing interference (as a result of test signals not reaching the antenna system 251) to other communication devices 27 or interface devices 25 in the local network 20.

As shown in FIG. 4, the switching circuitry includes two switches 302, with a first switch 302 being connected to the receiver 256 (of the transceiver 250) and a second switch 302 being connected to the transmitter 258 (of the transceiver 250). In one embodiment, the switches 302 can be PIN diode switches as described in more detail in U.S. patent application Ser. No. 17/340,880 entitled "Reducing Insertion Loss in a Switch for a Communication Device," which application is incorporated herein by reference. However, in other embodiments, the switches 302 may be any suitable single-pole, double-throw (SPDT) switch arrangement. The switches 302 can have a first position (as shown in FIGS. 2 and 3) that connects the receiver 256 and the transmitter 258 to the antenna system 251. The switches 302 can also have a second position (as shown in FIG. 4) that connects the receiver 256 to the transmitter 258 via a power attenuator 304. The power attenuator 304 can be used to dissipate power and lower the voltage (amplitude) of a signal sent by the transmitter 258 and received by the receiver 256 such that damage to the receiver 256 (and its corresponding components) can be avoided. The power attenuator 304 can also be used as a proper termination (e.g., 50Ω) for the transmitter 258.

In one embodiment, the power attenuator 304 can have three resistors $R_1$-$R_3$ connected in a "pi" arrangement. In one embodiment, the resistors $R_1$ and $R_3$ can have the same value when the transmitter 258 and the receiver 256 have the same impedance (e.g., 50Ω). For example, when the power attenuator 304 is configured as a 40 dB, 50Ω attenuator, $R_1$ and $R_3$ can each have a resistance of 51Ω and $R_2$ can have a resistance of 2500Ω. However, different arrangements of the power attenuator 304 (e.g., a "T" type configuration or a ladder architecture with 5 or 7 resistors to improve the RF isolation between the input and output of the power attenuator 304) can be used in other embodiments. In one embodiment, the power attenuator 304 can have a power rating that is less than the output power for the transmitter 258. For example, in an embodiment, resistor $R_2$ can be rated by the manufacturer for 1.5 W, but resistor $R_2$ can be able to accommodate a pulse power of 9 W (per the manufacturer) for a single pulse duration of 1 second. The power rating of the power attenuator 304 can be less than the output power of the transmitter 258 (as shown in the above example) because the diagnostic procedures performed on transceiver 250 are able to be completed before damage can occur to the components of the power attenuator 304 (e.g., from overheating). In an embodiment, the controller 254 can program the receiver 256 and the transmitter 258 to the desired settings (e.g., a few bytes at high bit rate) at the beginning of the diagnostic mode. Then, the controller 254 permits the test signal to pass through the transmitter 258 and the receiver 256 for the time needed (e.g., the millisecond range in one embodiment) to capture (or catch) the "reading" data from all of the transceiver sensors. In contrast, the communication channel between the controller 254 and an external test device, when performing diagnostics, is less reliable and slower than the internal connection for diagnostics described herein. The lower power rating for the power attenuator 304 enables lower cost parts to be used in the power attenuator 304.

Referring back to FIGS. 2 and 3, the controller 254 controls the switches 302 of the switching circuitry 255 to operate the transceiver 250 in either the communication mode (i.e., the transmitter 258 and the receiver 256 can send and receive signals with other communication devices 27) or the diagnostic mode (i.e., the transmitter 258 is connected to the receiver 256 to perform diagnostic procedures on the transmitter 258 and/or the receiver 256). The controller 254 can provide signals to the switches 302 of the switching circuitry 255 to position the switches 302 in a first position that provides a connection to the antenna system 251 to operate the transceiver 250 in the communication mode. In addition, the controller 254 can provide signals to the switches 302 of the switching circuitry 255 to position the switches 302 in a second position that provides a connection between the transmitter 258 and the receiver 256 via the power attenuator 304 to operate the transceiver 250 in diagnostic mode. When the transceiver 250 is operated in diagnostic mode, the switching circuitry 255 connects the transmitter 258 to the receiver 256 (via the power attenuator 304) to permit the transmitter 258 to be used to perform diagnostics on the receiver 256 and to permit the receiver 256 to be used to perform diagnostics on the transmitter 258. In an embodiment, the transceiver 250 can be a full-duplex transceiver such that the receiver 256 and the transmitter 258 have the capability to process signals at the same time when performing diagnostics on the transceiver 250 (e.g., a signal provided by the transmitter 258 can be processed by the receiver 256). While the embodiments of the interface device 25 shown in FIGS. 2 and 3 show a particular arrangement of components (e.g., antenna system 251, controller 254, switching circuitry 255 and transceiver 250), it is to be understood that in other embodiments, the interface device 25 may include more than one of some (or all) of the components shown in FIGS. 2 and 3 or may omit some of the components shown in FIGS. 2 and 3. In addition, it is to be understood that the interface device 25 may include additional components (e.g., filtering circuits, signal processing circuits, etc.), which have been omitted from FIGS. 2 and 3 for simplicity.

Figure 5:
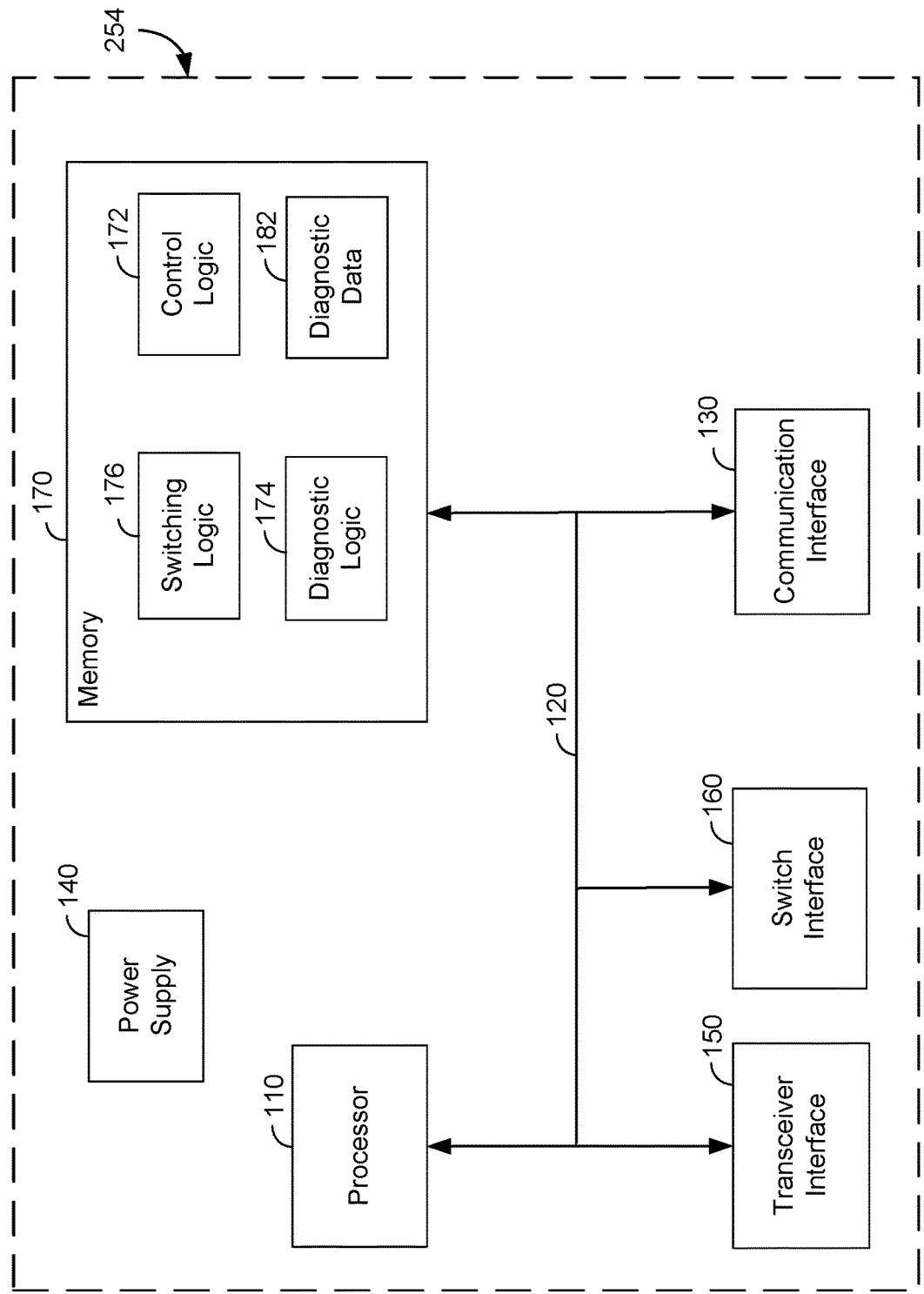
FIG. 5 is a block diagram showing an embodiment of the controller of FIGS. 2-3.

FIG. 5 shows an embodiment of the controller 254. The controller 254 shown by FIG. 5 can include logic 172, referred to herein as "control logic," for generally controlling the operation of the controller 254. In some embodiments, the control logic 172 of the controller 254 can also control the operation of the transceiver 250 and/or the interface device 25. The controller 254 also includes logic 174, referred to herein as "diagnostic logic," and logic 176, referred to herein as "switching logic." The diagnostic logic 174 can be used for performing diagnostic procedures on the receiver 256 and/or the transmitter 258 and for evaluating the results of the diagnostic procedures when the transceiver 250 is operated in diagnostic mode. The switching logic 176 can be used to control the switches 302 of the switching circuitry 255 for the intended mode of operation of the transceiver 250 (i.e., communication mode or diagnostic mode). In other embodiments, the diagnostic logic 174 and/or the switching logic 176 can be combined with the control logic 172 or with one another. The control logic 172, the diagnostic logic 174 and the switching logic 176 may be implemented in software, firmware, hardware, or any combination thereof. In FIG. 5, control logic 172, the diagnostic logic 174 and the switching logic 176 are implemented in software and stored in memory 170. However, other configurations of the control logic 172, the diagnostic logic 174 and the switching logic 176 are possible in other embodiments.

Note that the control logic 172, the diagnostic logic 174 and the switching logic 176, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The controller 254 may include at least one conventional processor 110, which includes processing hardware for executing instructions stored in the memory 170. As an example, the processor 110 may include a central processing unit (CPU) or a digital signal processor (DSP). The processor 110 communicates to and drives the other elements within the controller 254 via a local interface 120, which can include at least one bus. When the control logic 172, the diagnostic logic 174 and the switching logic 176 are implemented in software, the processor 110 may execute instructions of the control logic 172, the diagnostic logic 174 and the switching logic 176 to perform the functions ascribed herein to the control logic 172, the diagnostic logic 174 and the switching logic 176.

The controller 254 can have a communication interface 130 (which may be similar to interface 29) for connecting the interface device 25 to the network 40 (and the communications hub 30) or to other interface devices 25. The communication interface 130 may include a radio or other device for communicating wirelessly and/or corresponding connection ports for wired communications. The controller 254 can also have a power supply 140, which provides electrical power to the components of the controller 254 and possibly, in an embodiment, to components of the interface device 25 (e.g., the transceiver 250, the switching circuitry 255 and/or the antenna system 251). In one embodiment, the power supply 140 has an interface that allows it to plug into or otherwise interface with an external component, such as a wall outlet or battery, and receive electrical power from such external component. If desired, the power supply 140 may incorporate one or more batteries to permit the controller 254 to be independent of the external power component.

The controller 254 can include a transceiver interface 150 and a switch interface 160. In one embodiment, the transceiver interface 150 and the switch interface 160 may be combined into a single interface. The transceiver interface 150 enables the controller 254 to exchange (e.g., send and receive) signals and data with one or both of the transmitter 258 and the receiver 256 of the transceiver 250. For example, during diagnostic procedures, the transmitter 258 and the receiver 256 can provide diagnostic data to the controller 254, which is then stored in diagnostic data 182. The switch interface 160 enables the controller 254 to provide signals to the switches 302 of the switching circuitry 255 to control the position of switches 302 for operation of the transceiver 250 in either communication mode or diagnostic mode. Each of the transceiver interface 150 and the sensor interface 160 may include any suitable interfaces for providing signals and/or data between processor 110 and the corresponding component connected to the interface.

Figure 6:
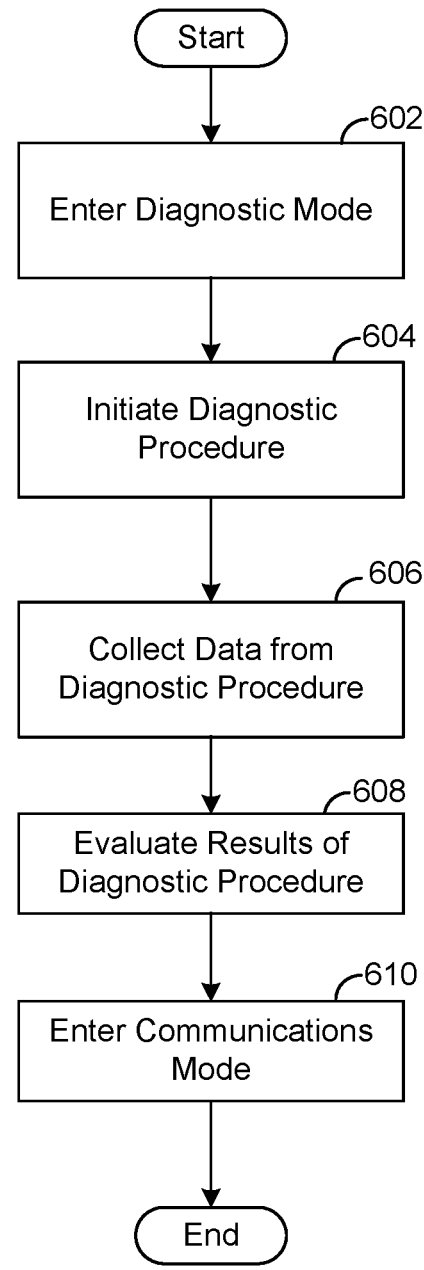
FIG. 6 is a flowchart showing an embodiment of a process for performing diagnostics in a transceiver.

FIG. 6 is directed to an embodiment of a process for performing diagnostics on a transceiver 250 of the interface device 25. Once the determination is made to perform diagnostics on the transceiver 250, the process begins by moving the switches 302 of switching circuitry 255 for operation of the transceiver 250 in the diagnostic mode (step 602). The controller 254 can send signals to the switches 302 of the switching circuitry 255 to place the switches 302 in the second position to connect the transmitter 258 to the receiver 256 via the power attenuator 304. In an embodiment, the controller 254 can program the components (e.g., the transmitter 258 and the receiver 256) of the transceiver 250 to evaluate certain parameters or settings (e.g., frequency, amplitude, modulation, bandwidth, etc.) associated with the test signal used for the diagnostic procedure prior to adjusting the switches 302 for operation of the transceiver 250 in diagnostic mode. The diagnostic logic 174 of the controller 254 can make the determination as to when diagnostics on the transceiver 250 are to be performed and then send signals/instructions to the switching logic 176 of the controller 254 to position the switching circuitry 255 accordingly.

In one embodiment, the diagnostic logic 174 can perform diagnostics on the transceiver 250 each time the interface device 25 is readied for operation (e.g., on "start-up" of the interface device 25 either from a sleep state or an "off" state). In other embodiments, the diagnostic logic 174 can perform diagnostics on the transceiver 250 of the interface device 25 at regular or preselected intervals (e.g., hourly, daily, weekly, etc.) or in response to the occurrence of preselected "trigger events" (e.g., the generation of an alert or alarm for the interface device 25). In still other embodiments, the controller 254 of the interface device 25 can receive instructions from the communications hub 30 to perform diagnostics on the transceiver 250.

Once the switching circuitry 255 has been arranged for operation of the transceiver 250 in diagnostic mode, the diagnostic logic 174 can initiate one or more diagnostic tests and/or procedures for the transmitter 258 and/or the receiver 256 (step 604). The diagnostic logic 174 can perform diagnostic procedures and tests to evaluate one or more components, sections or sub-systems of the receiver 256 and/or transmitter 258 such as modulators/demodulators, analog-to-digital converters (ADC)/digital-to-analog converters (DAC), filters, amplifiers, mixers, frequency synthesizers, power components, etc. For example, one diagnostic procedure involves the diagnostic logic 174 providing a signal or instruction to the transceiver 250 such that the transmitter 258 outputs a signal (i.e., a test signal) having a preselected frequency and/or amplitude (or power level) that is then received by the receiver 256. The signal output from the transmitter 258 passes through the power attenuator 304 (which reduces the power level of the signal) and is received at the receiver 256. As the signal travels between the transmitter 258 and the receiver 256, data can be collected regarding the operation and/or performance of the components or sub-systems (e.g., modulator/demodulator, power amplifier/low noise amplifier, intermediate stages, mixers, etc.) of the transmitter 258 and the receiver 256 (step 606). For example, data can be collected for the output transistor current (of the transmitter 258), the rectified RF voltage from the output coupler of the power amplifier (PA) (of the transmitter 258), the Received Signal Strength Indicator (RSSI) voltage (of the receiver 256), etc. In one embodiment, one or more sensors (e.g., current sensors, temperature sensors, voltage sensors, etc.) can be located in the transceiver 250 and used to collect the data for the components or sub-systems. For example, the digital data (from the sensors) associated with the transmission of the test signal can be collected if Digital Signal Processing (DSP) techniques are used.

In an embodiment, when the test signal is being communicated between the transmitter 258 and the receiver 256, the controller 254 can apply a test mode-ON configuration (sometimes referred to as a Push-To-Talk (PTT) mode) to the transceiver 250 while the test signal is being communicated. When the test mode-ON configuration is applied to the transceiver 250, the sensors of the transceiver 250 know that diagnostics on the transceiver 250 are being performed (as opposed to routine monitoring functions for the transceiver 250). The data collected during the application of the test mode configuration can then be used for diagnostic purposes. Once the test signal has been communicated, the controller 254 can apply a test mode-OFF configuration to the transceiver 250. When in the test mode-OFF configuration, the sensors of the transceiver 250 perform their normal routine monitoring functions for the transceiver 250. In other embodiments, the controller 254 can provide additional signals or instructions to the transceiver 250 resulting in a test signal having different frequencies and/or amplitudes to evaluate other parameters or settings. In other words, steps 604 and 606 can be repeated for different test signals that evaluate different parameters or settings of the transceiver 250.

Once the diagnostic procedures or tests have been performed on the transmitter 258 and the receiver 256 and the corresponding data has been collected, the results of the procedures or tests can be provided to the diagnostic logic 174 of the controller 254 and stored in diagnostic data 182. The stored diagnostic data 182 can then be processed to evaluate the performance of the transmitter 258 and/or the receiver 256 of the transceiver 250 (step 608). The evaluation of the diagnostic data 182 can be performed locally (e.g., by the diagnostic logic 174 of the controller 254), remotely (e.g., by the communication hub 30), or in some combination of locally and remotely.

In one embodiment, the evaluation of the stored diagnostic data 182 can be performed by comparing the results of a diagnostic procedure to corresponding reference data or threshold values or ranges, which reference data can be stored either in diagnostic data 182, memory 170 or elsewhere (e.g., in memory at the communication hub 30). The reference data can be previously obtained by performing the diagnostic procedure on a transceiver 250, which may or may not be the transceiver 250 undergoing the diagnostic procedure, known to be operating properly. In an embodiment, the reference data can be obtained from the transceiver 250 undergoing the diagnostic procedure as part of the initialization of the interface device 25 into the local network 20.

If the results of the diagnostic procedure are within predefined tolerances of the corresponding reference data (e.g., with a predefined range above or below a reference value or threshold value), the receiver 256 or the transmitter 258 (or component thereof) is determined to be operating properly. However, if the results of the diagnostic procedure are outside of the predefined tolerances, remedial procedures or actions can be performed. Some examples of remedial procedures or actions may be the issuance of an alarm, the disabling of the transmitter 258 or receiver 256, or the performance of the diagnostic procedure or test a second time.

In addition, to comparing the results of the diagnostic procedure to the reference data, the results of the diagnostic procedure can also be evaluated either by the diagnostic logic 174 or the communications hub 30 to identify possible trends in the results. For example, the current results of a diagnostic procedure can be compared to a preselected number of prior results (e.g., 5 to 10 prior results) to determine if a trend, such as an increasing or decreasing value, is forming in the results even if the results are within the corresponding predefined tolerance. If a trend is identified in the results, a remedial action or procedure may be taken before the failure of the transceiver 250 or an out-of-tolerance determination is made.

Once the evaluation of the diagnostic results is completed, the transceiver 250 enter the communication mode (step 610). To place the transceiver 250 in the communication mode, the controller 254 can send signals to the switches 302 of the switching circuitry 255 to place the switches 302 in the first position to connect the transmitter 258 and the receiver 256 to the antenna system 251. In an embodiment, the diagnostic logic 174 of the controller 254 can determine when diagnostics on the transceiver 250 has been completed and send signals/instructions to the switching logic 176 to arrange the switching circuitry 255 accordingly.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A communication device comprising:
   an antenna system;
   a transceiver comprising a transmitter and a receiver; and
   switching circuitry connected to the antenna system and the transceiver, the switching circuitry comprising:
   a first switch having a first position and a second position; and a second switch having a first position and a second position;

a controller configured to switch the switching circuitry between the first position and the second position of the first switch, and the first position and the second position of the second switch, wherein:

both the first switch and the second switch being in the first position connect the transmitter and the receiver to the antenna system for a communication mode;

both the first switch and the second switch being in the second position disconnect the transmitter and the receiver from the antenna system and connect the transmitter to the receiver via a power attenuator for a diagnostic procedure, the power attenuator having a power rating lower than the transmitter;

the controller provides an input instruction signal to the transmitter to initiate the diagnostic procedure, and the transmitter in response thereto, outputs a single pulse test signal at a preselected power level, the single pulse test signal passes through the power attenuator for a predetermined pulse time duration and is received by the receiver, and the controller receives results associated with the diagnostic procedure from the transceiver, and evaluates the results associated with the diagnostic procedure.

2. The communication device of claim 1, wherein the antenna system comprises a first antenna connected to the transmitter by the switching circuitry and a second antenna connected to the receiver by the switching circuitry.

3. The communication device of claim 1, wherein the antenna system comprises:

an antenna; and a duplexer connected between the antenna and the switching circuitry, the duplexer configured to provide frequency division between signals for the transmitter and the receiver.

4. The communication device of claim 1, wherein the transceiver is a full-duplex transceiver.

5. The communication device of claim 1, wherein the controller is configured to compare the results associated with the diagnostic procedure to a corresponding preselected reference value.

6. The communication device of claim 5, wherein the controller is configured to issue an alert in response to the comparison.

7. The communication device of claim 1, wherein the controller is configured to provide the results associated with the diagnostic procedure to a communications hub for evaluation.

8. The communication device of claim 1, wherein the controller, upon completion of the diagnostic procedure, is configured to move the switching circuitry to the first position.

9. The communication device of claim 1, wherein the communication device operates within a local network, and the diagnostic procedure is performed without causing interference to other communication devices or interface devices operating within the local network.

10. The communication device of claim 1, wherein the diagnostic procedure performs diagnostics on the transceiver automatically without user input.

11. The communication device of claim 1, wherein the diagnostic procedure automatically performs diagnostics on the transceiver in response to one of:

regular or preselected timing intervals;

a preselected trigger event.

12. The communication device of claim 1, wherein the transceiver is a full-duplex transceiver and the diagnostic procedure is a self-diagnostic procedure for the full-duplex transceiver.

13. The communication device of claim 1, wherein the preselected power level of the single pulse test signal, output by the transmitter, is set based on a pulse power rating of the attenuator.

14. The communication device of claim 1, wherein the power attenuator is used to dissipate power and lower the voltage (amplitude) of the single pulse test signal sent by the transmitter and received by the receiver.

15. The communication device of claim 1, wherein as the single pulse test signal travels between the transmitter and the receiver, data associated with operational performance of components of the transmitter and the receiver is collected by the controller.

* * * * *